(12) United States Patent
Suzuki

(10) Patent No.: US 10,856,147 B2
(45) Date of Patent: Dec. 1, 2020

(54) IDENTIFICATION INFORMATION PROVIDING SYSTEM, IDENTIFICATION INFORMATION PROVIDING APPARATUS, IDENTIFICATION INFORMATION PROVIDING METHOD, AND NON-TRANSITORY RECORDING MEDIUM

(71) Applicant: RICOH COMPANY, LTD., Tokyo (JP)

(72) Inventor: Koji Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 72 days.

(21) Appl. No.: 16/117,292

(22) Filed: Aug. 30, 2018

(65) Prior Publication Data

US 2019/0014474 A1    Jan. 10, 2019

Related U.S. Application Data

(63) Continuation of application No. PCT/JP2017/005097, filed on Feb. 13, 2017.

(30) Foreign Application Priority Data

Mar. 9, 2016  (JP) .................................. 2016-046162

(51) Int. Cl.
*H04W 12/06* (2009.01)
*H04W 12/12* (2009.01)
(Continued)

(52) U.S. Cl.
CPC ............. *H04W 12/06* (2013.01); *H04L 9/32* (2013.01); *H04L 63/0428* (2013.01);
(Continued)

(58) Field of Classification Search
CPC ... H04L 9/32; H04L 63/0428; H04L 63/0876; H04W 4/80; H04W 84/12
See application file for complete search history.

(56) References Cited

U.S. PATENT DOCUMENTS

| 5,889,861 A | 3/1999 | Ohashi et al. |
| 9,906,910 B2 * | 2/2018 | Suzuki .................. G01S 5/0242 |

(Continued)

FOREIGN PATENT DOCUMENTS

| EP | 3128768 | 2/2017 |
| JP | 3271460 | 4/2002 |

(Continued)

OTHER PUBLICATIONS

Extended European Search Report dated Nov. 14, 2018 in Patent Application No. 17762811.2, 8 pages.

(Continued)

*Primary Examiner* — Hee K Song
(74) *Attorney, Agent, or Firm* — Xsensus LLP

(57) ABSTRACT

An identification information providing system includes a sending processor configured to send a predetermined signal including identification information; a managing processor configured to set or change identification information and manage predetermined identification information that is set or changed; and a receiving processor configured to be able to receive a predetermined signal to obtain predetermined identification information and perform synchronization, and to use a result of determining matching between obtained predetermined identification information and a received predetermined signal to determine whether the sending processor is an authorized sending processor.

18 Claims, 17 Drawing Sheets

(51) Int. Cl.
    *H04W 12/02*     (2009.01)
    *H04L 9/32*     (2006.01)
    *H04W 12/00*     (2009.01)
    *H04L 29/06*     (2006.01)
    *H04W 84/12*     (2009.01)
    *H04W 4/80*     (2018.01)

(52) U.S. Cl.
    CPC ......... *H04L 63/0876* (2013.01); *H04W 12/00* (2013.01); *H04W 12/02* (2013.01); *H04W 12/12* (2013.01); *H04W 4/80* (2018.02); *H04W 12/00516* (2019.01); *H04W 84/12* (2013.01)

(56) References Cited

U.S. PATENT DOCUMENTS

| | | | |
|---|---|---|---|
| 2014/0220883 A1* | 8/2014 | Emigh | H04H 20/61 |
| | | | 455/3.01 |
| 2014/0254466 A1* | 9/2014 | Wurster | H04L 12/189 |
| | | | 370/312 |
| 2014/0370917 A1 | 12/2014 | Buchheim et al. | |
| 2015/0276915 A1* | 10/2015 | Konishi | G01S 1/68 |
| | | | 342/450 |
| 2016/0100282 A1* | 4/2016 | Pounds | H04W 4/80 |
| | | | 455/456.1 |
| 2016/0266227 A1* | 9/2016 | Newman | G01S 1/68 |
| 2016/0270143 A1* | 9/2016 | Tachikawa | H04W 12/12 |

FOREIGN PATENT DOCUMENTS

| | | |
|---|---|---|
| JP | 2004-032133 | 1/2004 |
| JP | 2007-006320 | 1/2007 |
| JP | 2011-097437 | 5/2011 |
| JP | 2014-027616 | 2/2014 |
| JP | 2015-192261 | 11/2015 |
| JP | 2016-046651 | 4/2016 |
| JP | 2016-510566 | 4/2016 |
| JP | 2017-084286 | 5/2017 |
| WO | WO 2015/061673 A1 | 4/2015 |
| WO | 2015/076345 | 5/2015 |
| WO | WO 2015/118971 A1 | 8/2015 |
| WO | 2015/151981 | 10/2015 |

OTHER PUBLICATIONS

International Search Report dated Mar. 28, 2017 in PCT/JP2017/005097 filed on Feb. 13, 2017 (with English Translation).
Written Opinion dated Mar. 28, 2017 in PCT/JP2017/005097 filed on Feb. 13, 2017.

* cited by examiner

FIG.7A
ID LIST (BEFORE CHANGE)
| No. | ID |
|---|---|
| 1 | 1111 |
| 2 | 2222 |
| 3 | 3333 |
ID LIST (AFTER CHANGE)
| No. | ID |
|---|---|
| 1 | 5555 |
| 2 | 6666 |
| 3 | 7777 |
FIG.7B
CONTENT LIST (BEFORE CHANGE)
| ID | CONTENT ID |
|---|---|
| 1111 | AAAA |
| 2222 | BBBB |
| 3333 | CCCC |
CONTENT LIST (AFTER CHANGE)
| ID | CONTENT ID |
|---|---|
| 5555 | AAAA |
| 6666 | BBBB |
| 7777 | CCCC |
FIG.7C
BEACON ID (BEFORE CHANGE)
| ID |
|---|
| 1111 |
BEACON ID (AFTER CHANGE)
| ID |
|---|
| 5555 |
FIG.7D
ID LIST (BEFORE CHANGE)
| No. | ID |
|---|---|
| 1 | 1111 |
| 2 | 2222 |
| 3 | 3333 |
ID LIST (AFTER CHANGE)
| No. | ID |
|---|---|
| 1 | 5555 |
| 2 | 6666 |
| 3 | 7777 |

FIG.9A

ID LIST (BEFORE CHANGE)

| No. | ID |
|---|---|
| 1 | 1111 |
| 2 | 2222 |
| 3 | 3333 |

ID LIST (AFTER CHANGE)

| No. | ID |
|---|---|
| 1 | 5555 |
| 2 | 6666 |
| 3 | 7777 |

FIG.9B

CONTENT LIST (BEFORE CHANGE)

| ID | CONTENT ID |
|---|---|
| 1111 | AAAA |
| 2222 | BBBB |
| 3333 | CCCC |

CONTENT LIST (AFTER CHANGE)

| ID | CONTENT ID |
|---|---|
| 5555 | AAAA |
| 6666 | BBBB |
| 7777 | CCCC |

FIG.9C

BEACON ID (BEFORE CHANGE)

| ID |
|---|
| 1111 |

BEACON ID (AFTER CHANGE)

| ID |
|---|
| 5555 |

FIG.9D

ID LIST (BEFORE CHANGE)

| No. | ID | UPDATE DATE AND TIME |
|---|---|---|
| 1 | 1111 | 2015/12/24/15:30 |
| 2 | 2222 | 2015/12/24/15:30 |
| 3 | 3333 | 2015/12/24/15:30 |

ID LIST (AFTER CHANGE)

| No. | ID | UPDATE DATE AND TIME |
|---|---|---|
| 1 | 5555 | 2015/12/25/16:25 |
| 2 | 6666 | 2015/12/25/16:25 |
| 3 | 7777 | 2015/12/25/16:25 |

FIG.11A

ID LIST (BEFORE CHANGE)

| No. | ID |
|---|---|
| 1 | 1111 |
| 2 | 2222 |
| 3 | 3333 |

ID LIST (AFTER CHANGE)

| No. | ID |
|---|---|
| 1 | 5555 |
| 2 | 6666 |
| 3 | 7777 |

FIG.11B

CONTENT LIST (BEFORE CHANGE)

| ID | CONTENT ID |
|---|---|
| 1111 | AAAA |
| 2222 | BBBB |
| 3333 | CCCC |

CONTENT LIST (AFTER CHANGE)

| ID | CONTENT ID |
|---|---|
| 5555 | AAAA |
| 6666 | BBBB |
| 7777 | CCCC |

FIG.11C

BEACON ID (BEFORE CHANGE)

| ID |
|---|
| 1111 |

BEACON ID (AFTER CHANGE)

| ID |
|---|
| 5555 |

FIG.11D

ID LIST (BEFORE CHANGE)

| No. | ID |
|---|---|
| 1 | 1111 |
| 2 | 2222 |
| 3 | 3333 |

ID LIST (AFTER CHANGE)

| No. | ID |
|---|---|
| 1 | 5555 |
| 2 | 6666 |
| 3 | 7777 |

FIG.13A

ID LIST (CURRENT TIME)

| No. | ID |
|---|---|
| 1 | 1111 |
| 2 | 2222 |
| 3 | 3333 |

ID LISTS (NEXT TIME AND THEREAFTER)

FOR DECEMBER 25
(TODAY UNTIL 24:00)

| No. | ID |
|---|---|
| 1 | 5555 |
| 2 | 6666 |
| 3 | 7777 |

FOR DECEMBER 26
(TODAY 24:00 THROUGH TOMORROW 24:00)

| No. | ID |
|---|---|
| 1 | 111a |
| 2 | 222a |
| 3 | 333a |

FOR DECEMBER 27
(TOMORROW 24:00 THROUGH DAY AFTER TOMORROW 24:00)

| No. | ID |
|---|---|
| 1 | 111b |
| 2 | 222b |
| 3 | 333b |

FIG.13B

ID LIST (BEFORE CHANGE)

| No. | ID |
|---|---|
| 1 | 1111 |
| 2 | 2222 |
| 3 | 3333 |

ID LIST (AFTER CHANGE)

| No. | ID |
|---|---|
| 1 | 5555 |
| 2 | 6666 |
| 3 | 7777 |

FIG.13C

CONTENT LIST (BEFORE CHANGE)

| ID | CONTENT ID |
|---|---|
| 1111 | AAAA |
| 2222 | BBBB |
| 3333 | CCCC |

CONTENT LIST (AFTER CHANGE)

| ID | CONTENT ID |
|---|---|
| 5555 | AAAA |
| 6666 | BBBB |
| 7777 | CCCC |

FIG.13D

BEACON ID (BEFORE CHANGE)

| ID |
|---|
| 1111 |

BEACON ID (AFTER CHANGE)

| ID |
|---|
| 5555 |

FIG.15A

ID LIST (BEFORE CHANGE)

| No. | ID |
|---|---|
| 1 | 1111X |
| 2 | 2222X |
| 3 | 3333X |

ID LIST (AFTER CHANGE)

| No. | ID |
|---|---|
| 1 | 1111Y |
| 2 | 2222Y |
| 3 | 3333Y |

FIG.15B

CONTENT LIST (BEFORE CHANGE)

| ID | CONTENT ID |
|---|---|
| 1111X | AAAA |
| 2222X | BBBB |
| 3333X | CCCC |

CONTENT LIST (AFTER CHANGE)

| ID | CONTENT ID |
|---|---|
| 1111Y | AAAA |
| 2222Y | BBBB |
| 3333Y | CCCC |

FIG.15C

BEACON ID (BEFORE CHANGE)

| ID (BASE) | ENCRYPTION MANNER | ENCRYPTED ID |
|---|---|---|
| 1111 | X | @@@@ |

BEACON ID (AFTER CHANGE)

| ID (BASE) | ENCRYPTION MANNER | ENCRYPTED ID |
|---|---|---|
| 1111 | Y | **** |

FIG.15D

ID LIST (BEFORE CHANGE)

| No. | ID |
|---|---|
| 1 | 1111X |
| 2 | 2222X |
| 3 | 3333X |

ID LIST (AFTER CHANGE)

| No. | ID |
|---|---|
| 1 | 1111Y |
| 2 | 2222Y |
| 3 | 3333Y | though
IDENTIFICATION INFORMATION PROVIDING SYSTEM, IDENTIFICATION INFORMATION PROVIDING APPARATUS, IDENTIFICATION INFORMATION PROVIDING METHOD, AND NON-TRANSITORY RECORDING MEDIUM

CROSS-REFERENCE TO RELATED APPLICATIONS

The present patent application is a continuation of International Application No. PCT/JP2017/005097, filed Feb. 13, 2017, which is based on and claims priority to Japanese application No. 2016-046162, filed Mar. 9, 2016. The contents of these applications are incorporated herein by reference in their entirety.

FIELD OF THE INVENTION

The present invention relates to an identification information providing system, an identification information providing apparatus, an identification information providing method, and a non-transitory recording medium.

BACKGROUND ART

A beacon is known as a means to know a position of a mobile terminal in an indoor environment where GPS radio waves are not reached.

According to this technology, a beacon, sending a broadcast signal of radio waves of BLE (Bluetooth Low Energy) or an ultrasonic signal, sends a signal that includes information such as a beacon ID associated with position information, and so forth, and a mobile terminal obtains the position information on the basis of information received from the beacon. Such obtaining of position information is used for a content service that provides information according to the position of a user. For example, a plurality of beacons are installed on a ceiling area of indoor facilities such as a shopping mall, and beacon IDs are sent from the beacons, respectively. Then, a mobile terminal such as a smartphone having received a beacon ID sends the beacon ID to a content server through a network and obtains the position information associated with the beacon ID itself, content such as guidance information concerning the position, or a coupon that is valid only in the position.

Further, a method for improving security between a terminal and an access point in a wireless LAN system by not performing main communication with a terminal to which a service set identifier of the access point is not set is known (see Patent Document 1).

SUMMARY

According to one aspect of the present invention, an identification information providing system includes a sending processor configured to send a predetermined signal including identification information; a managing processor configured to set or change identification information and manage predetermined identification information that is set or changed; and a receiving processor configured to be able to receive a predetermined signal to obtain predetermined identification information and perform synchronization, and to use a result of determining matching between obtained predetermined identification information and a received predetermined signal to determine whether the sending processor is an authorized sending processor.

BRIEF DESCRIPTION OF THE DRAWINGS

FIG. 7A illustrates an example of changes in various data according to the first process example (1/4).

FIG. 7B illustrates an example of changes in various data according to the first process example (2/4).

FIG. 7C illustrates an example of changes in various data according to the first process example (3/4).

FIG. 7D illustrates an example of changes in various data according to the first process example (4/4).

FIG. 9A illustrates an example of changes in various data according to the second process example (1/4).

FIG. 9B illustrates an example of changes in various data according to the second process example (2/4).

FIG. 9C illustrates an example of changes in various data according to the second process example (3/4).

FIG. 9S illustrates an example of changes in various data according to the second process example (4/4).

FIG. 11A illustrates an example of changes in various data according to the third process example (1/4).

FIG. 11B illustrates an example of changes in various data according to the third process example (2/4).

FIG. 11C illustrates an example of changes in various data according to the third process example (3/4).

FIG. 11D illustrates an example of changes in various data according to the third process example (4/4).

FIG. 13A illustrates an example of changes in various data according to the fourth process example (1/5).

FIG. 13B illustrates an example of changes in various data according to the fourth process example (2/5).

FIG. 13C illustrates an example of changes in various data according to the fourth process example (3/5).

FIG. 13D illustrates an example of changes in various data according to the fourth process example (4/5).

FIG. 15A illustrates an example of changes in various data according to the fifth process example (1/4).

FIG. 15B illustrates an example of changes in various data according to the fifth process example (2/4).

FIG. 15C illustrates an example of changes in various data according to the fifth process example (3/4).

FIG. 15D illustrates an example of changes in various data according to the fifth process example (4/4).

DESCRIPTION OF EMBODIMENTS

In providing information with the use of a beacon described above, a countermeasure against a "masquerade" masquerading a signal that is sent from a beacon is desired. For example, in a case where a beacon sending an ultrasonic signal is used, content that cannot normally be obtained may be obtained as a result of an ultrasonic signal being recorded, thereafter the recorded signal being reproduced at a certain position, and the reproduced signal being received at a mobile terminal. Further, normal receiving of content at a mobile terminal may be confused.

Note that, according to the above-described technology of preventing communication with the use of a service set identifier, it may be possible to prevent connection of an unauthorized terminal. However, it may be impossible to prevent a masquerade at a beacon.

The embodiments of the present invention have been proposed in consideration of the above-mentioned point, and an object of the embodiments of the present invention is to prevent masquerading of identification information at a beacon or the like. According to the embodiments of the present invention, it is possible to prevent masquerading of identification information at a beacon or the like.

Below, the embodiments of the present invention will be described.
<Configuration>

Figure 1:
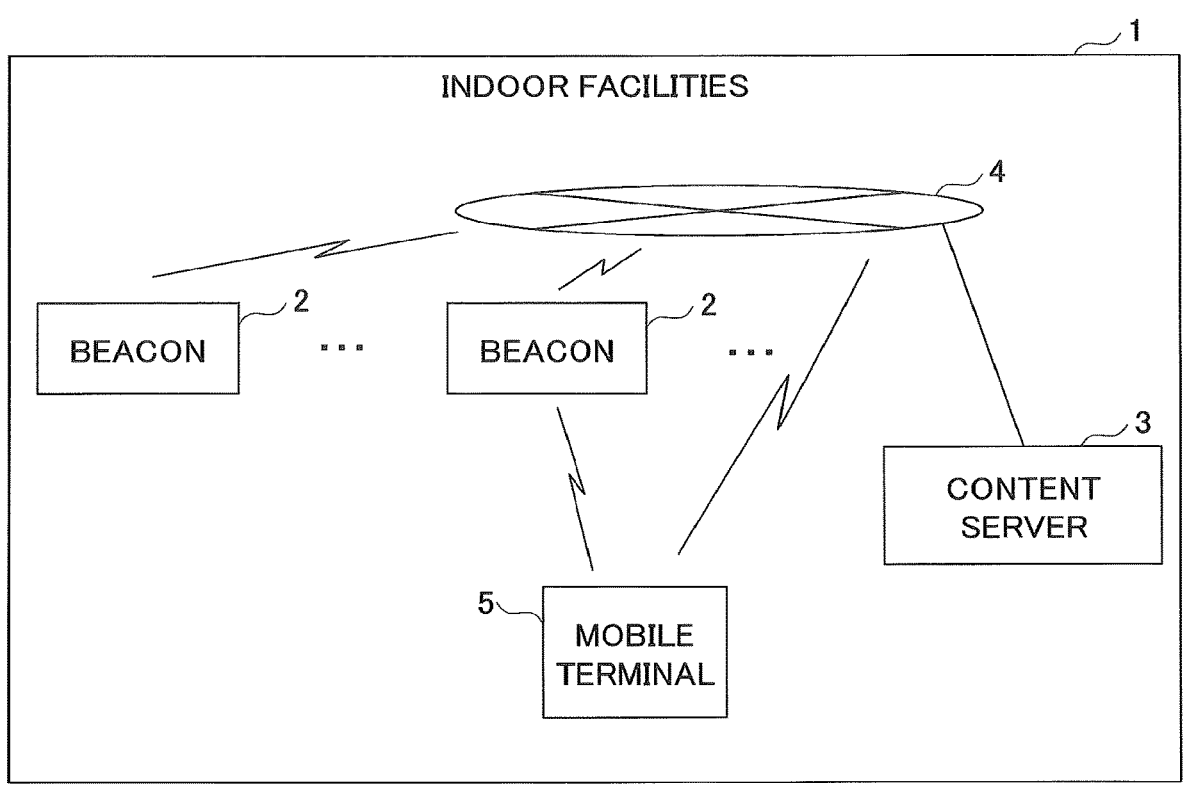
FIG. 1 illustrates a configuration example of a system according to an embodiment of the present invention.

FIG. 1 illustrates a configuration example of a system according to an embodiment of the present invention. In FIG. 1, a plurality of beacons 2 are installed on a ceiling area or the like of indoor facilities 1 such as a shopping mall or the like. The beacons 2 are information sending devices that are capable of sending broadcast signals of radio waves of BLE (Bluetooth Low Energy) or ultrasonic signals. Further, a content server 3 is installed at any position in the indoor facilities 1. The beacons 2 are connected with the content server 3 through a wired or wireless network 4 in a manner of being able to perform communication. The content server 3 manages setting and changing of beacon IDs that are sent from the beacons 2, and stores content such as positional information (latitude and longitude information), map information, notification information, coupons, and so forth, which are associated with the beacon IDs.

In the indoor facilities 1, a mobile terminal 5 held by a user, such as a smartphone, a PC (Person Computer), a wearable device, or the like, is capable of receiving signals sent from the beacons 2 such as radio waves or ultrasonic waves. Further, the mobile terminal 5 is capable of connecting to the content server 3 through the network 4 as an occasion arises, to obtain content corresponding to a beacon ID received from a beacon 2.

Figure 2:
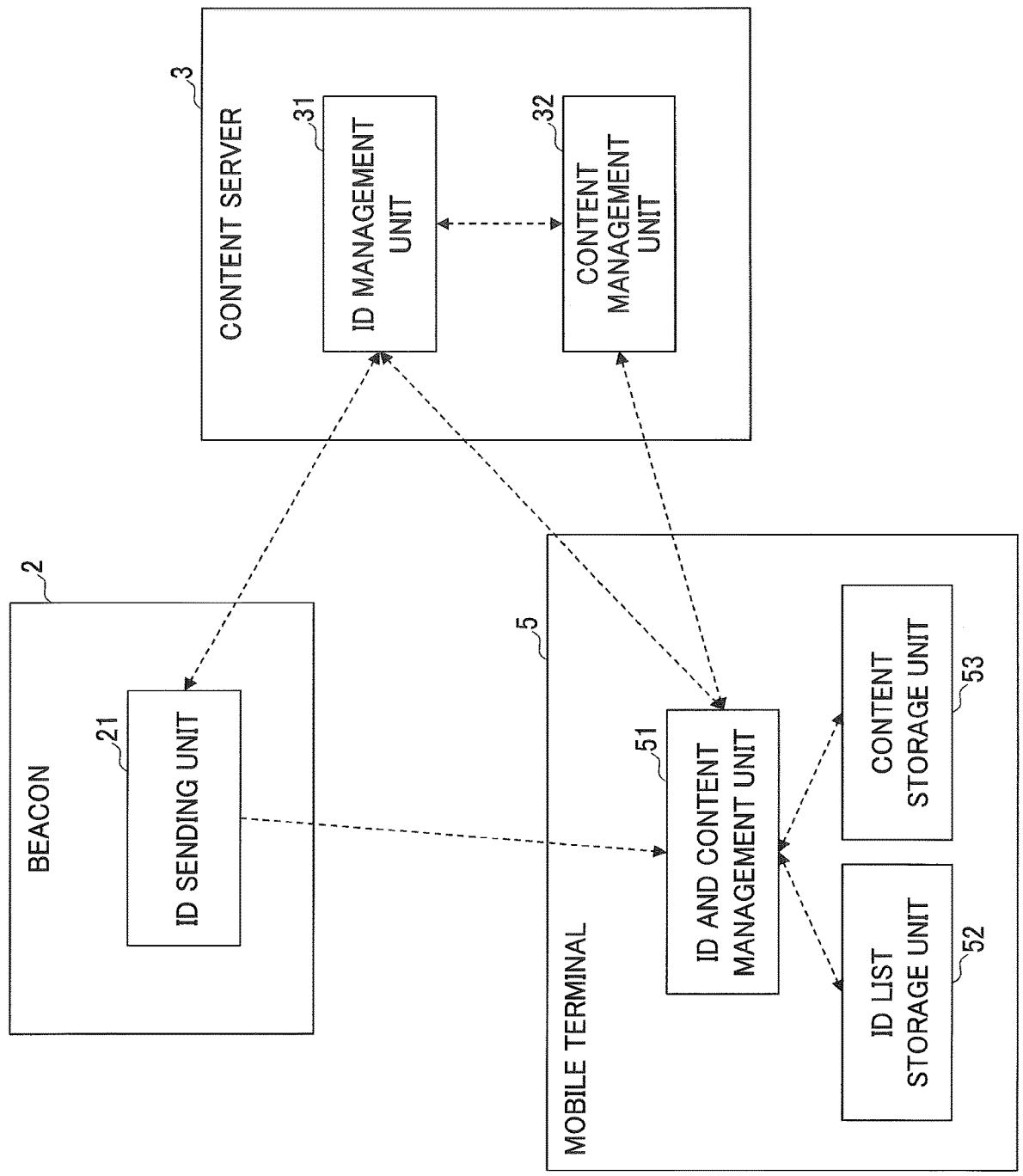
FIG. 2 illustrates an example of a functional configuration of each apparatus.

FIG. 2 illustrates an example of a functional configuration of each apparatus. In FIG. 2, a beacon 2 includes an ID sending unit 21 to send an individually set or changed beacon ID as a radio wave signal or an ultrasonic signal. The content server 3 includes an ID management unit 31 to manage setting of a beacon ID to a beacon 2 and changing of a beacon ID; and a content management unit 32 to manage content associated with a beacon ID. The mobile terminal 5 includes an ID and content management unit 51 to receive a beacon ID, determine whether a beacon ID is appropriate, and obtain content associated with a beacon ID; an ID list storage unit 52 to store an ID list that is a list of valid beacon IDs; and a content storage unit 53 to store obtained content.

Figure 3:
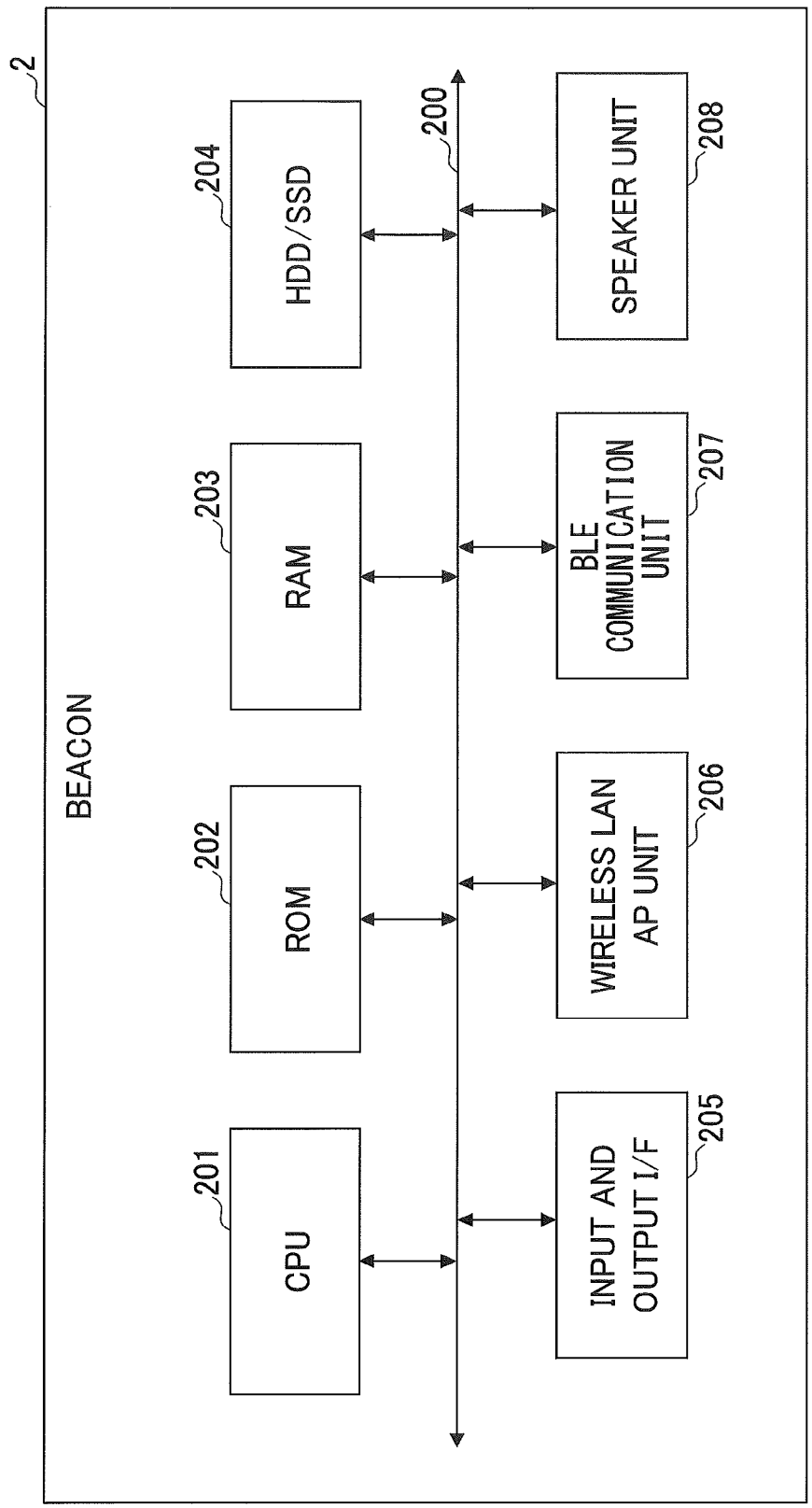
FIG. 3 illustrates an example of a hardware configuration of a beacon.

FIG. 3 illustrates an example of a hardware configuration of a beacon 2. In FIG. 3, the beacon 2 includes a CPU (Central Processing Unit) 201, a ROM (Read Only Memory) 202, a RAM (Random Access Memory) 203, and a HDD (Hard Disk Drive) and SSD (Solid State Drive) 204, being mutually connected through a bus 200. The CPU 201 uses the RAM 203 as a work area to execute a program stored in the ROM 202, the HDD/SSD 204, or the like so as to perform overall control of operation of the beacon 2.

Further, the beacon 2 includes an input and output I/F (Interface) 205, a wireless LAN AP (Local Area Network Access Point) unit 206, a BLE communication unit 207, and a speaker unit 208. The input and output I/F 205 receives a user operation and so forth. The wireless LAN AP unit 206 is an interface for performing communication with another information processing apparatus through a wireless LAN. The BLE communication unit 207 performs BLE communication and the present embodiment uses the BLE communication unit 207 for transmission of a broadcast signal of radio waves. The speaker unit 208 transmits an ultrasonic signal. In a case where the present embodiment uses only the BLE transmission function, the speaker unit 208 may be omitted. In a case where the present embodiment uses only ultrasonic waves, the BLE communication unit 207 may be omitted.

The function (of the ID sending unit 21) of a beacon 2 described with reference to FIG. 2 is implemented as a result of the CPU 201 executing a predetermined program. The program may be obtained through a recording medium, may be obtained through a network, or may be built in a ROM. The ID sending unit 21 of a beacon 2 also includes, as functions, a receiving function unit (i.e., the wireless LAN AP unit 206 illustrated in FIG. 3 or a wired LAN unit not illustrated) to receive from the content server 3 a beacon ID change request; and a beacon ID storing function unit (for example, the HDD/SSD 204, the RAM 203, or the ROM 202 in FIG. 3) to store beacon IDs.

Figure 4:
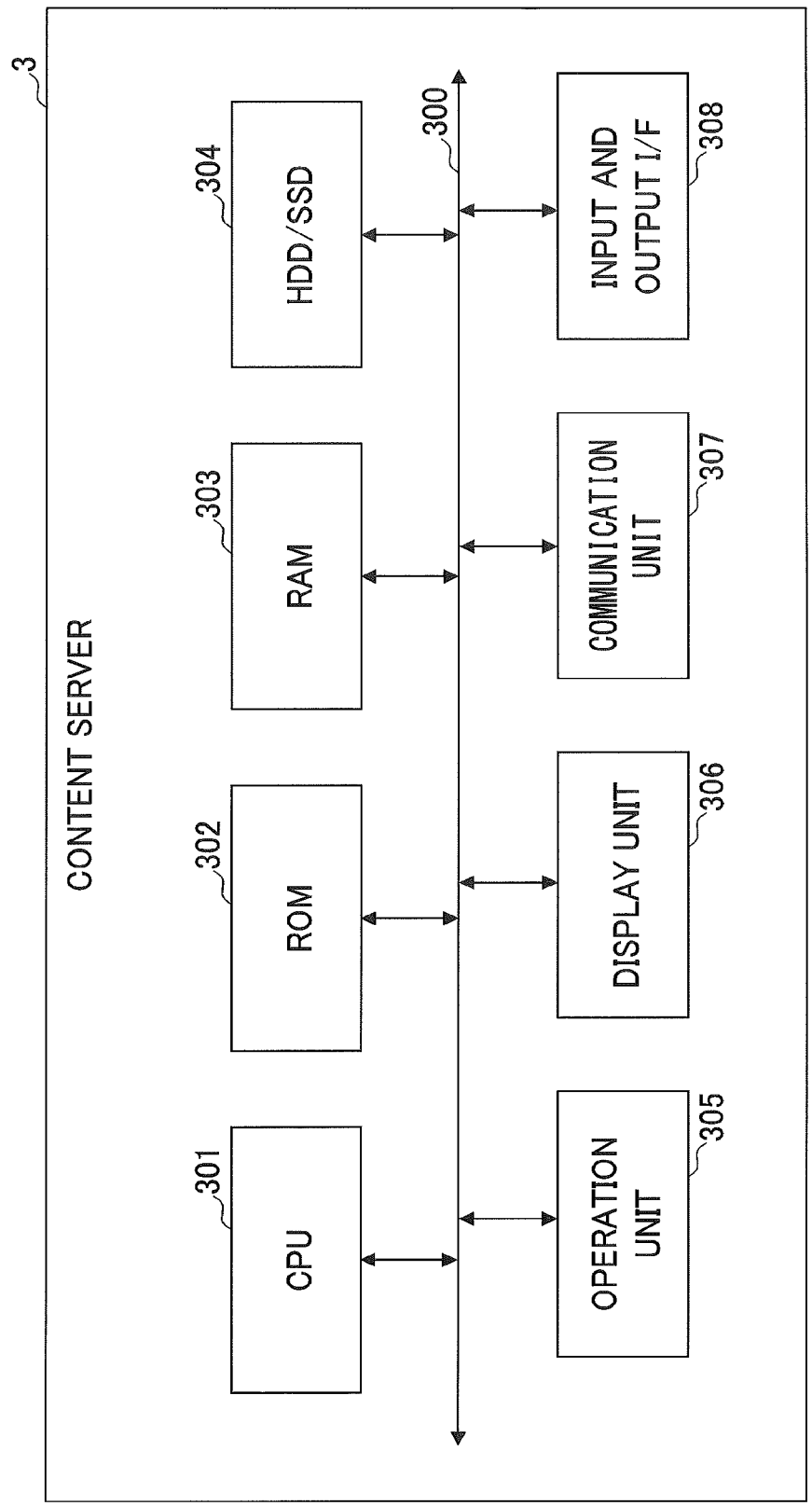
FIG. 4 illustrates an example of a hardware configuration of a content server.

FIG. 4 illustrates an example of a hardware configuration of the content server 3. In FIG. 4, the content server 3 includes a CPU 301, a ROM 302, a RAM 303, and a HDD/SSD 304, being mutually connected through a bus 300. The CPU 301 uses the RAM 303 as a work area to execute a program stored in the ROM 302, the HDD/SSD 304 or the like so as to perform overall control of operation of the content server 3.

Further, the content server 3 includes an operation unit 305, a display unit 306, a communication unit 307, and an input and output I/F 308. The operation unit 305 receives a user's operation. The display unit 306 displays to a user an operation menu, a process status, and so forth. The communication unit 307 performs communication with another information processing apparatus. The input and output I/F 308 is an interface for inputting data from and outputting data to an external device or the like.

The functions of the content server 3 described above with reference to FIG. 2 are implemented as a result of the CPU 301 executing a predetermined program. The program may be obtained through a recording medium, may be obtained through a network, or may be built in a ROM.

Figure 5:
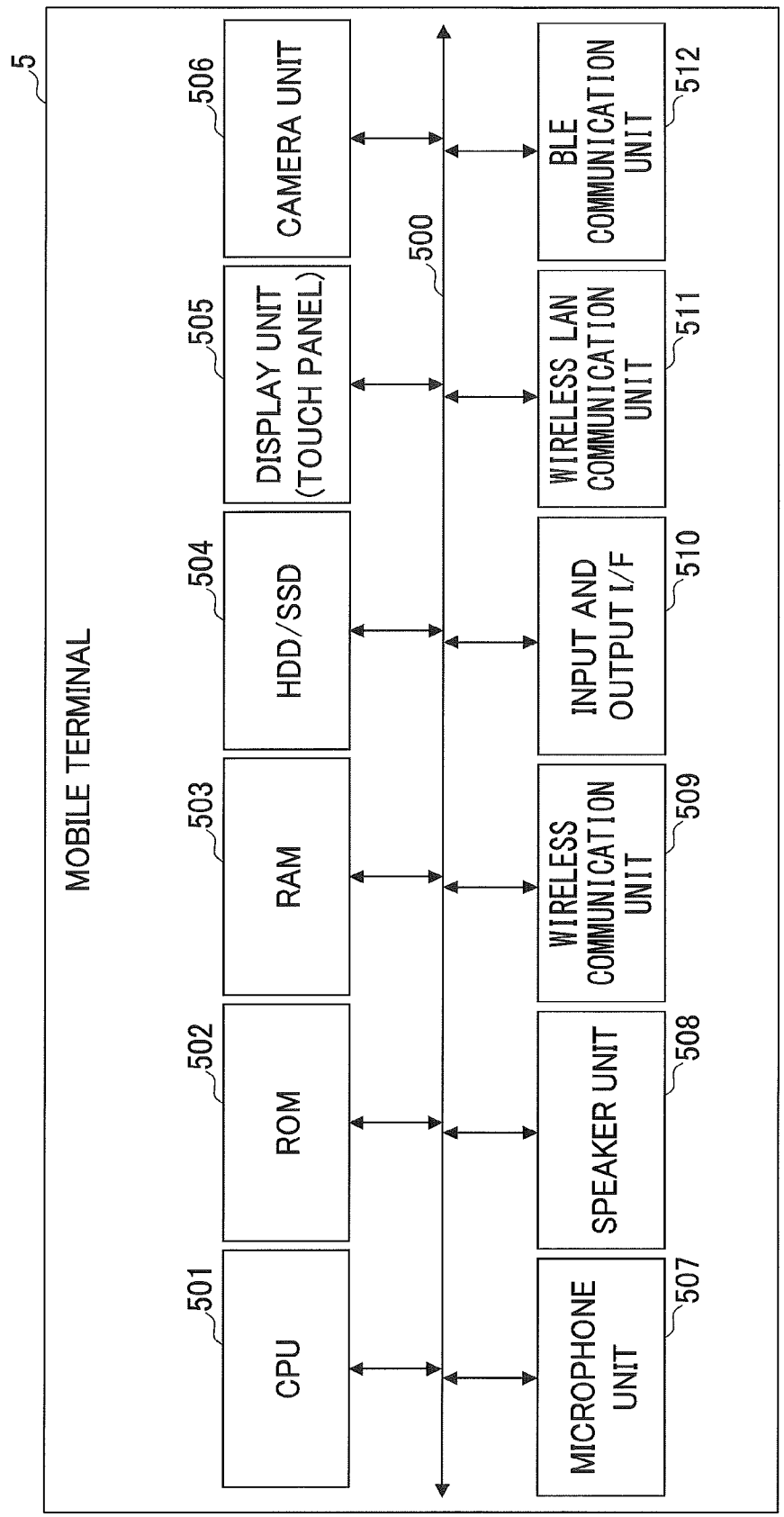
FIG. 5 illustrates an example of a hardware configuration of a mobile terminal.

FIG. 5 illustrates an example of a hardware configuration of the mobile terminal 5. In FIG. 5, the mobile terminal 5 includes a CPU 501, a ROM 502, a RAM 503, and a HDD/SSD 504, being mutually connected through a bus 500. The CPU 501 uses the RAM 503 as a work area to execute a program stored in the ROM 502, the HDD/SSD 504, or the like, so as to perform overall control of operation of the mobile terminal 5.

Further, the mobile terminal 5 includes a display unit 505, a camera unit 506, a microphone unit 507, a speaker unit 508, a wireless communication unit 509, an input and output I/F 510, a wireless LAN communication unit 511, and a BLE communication unit 512. The display unit 505 displays to a user an operation menu, a process status, and so forth. The camera unit 506 performs photographing by using a built-in camera. The microphone unit 507 obtains sound by using a built-in microphone. The speaker unit 508 outputs sound. The wireless communication unit 509 performs sound communication or data communication. The input and output I/F 510 is an interface for inputting data from and outputting data to an external device or the like. The wireless LAN communication unit 511 performs communication with another apparatus through a wireless LAN. The BLE communication unit 512 performs communication with another apparatus through BLE.

The functions of the mobile terminal 5 described above with reference to FIG. 2 are implemented as a result of the CPU 501 executing a predetermined program. The program may be obtained through a recording medium, may be obtained through a network, or may be built in a ROM.

First Process Example

Figure 6:
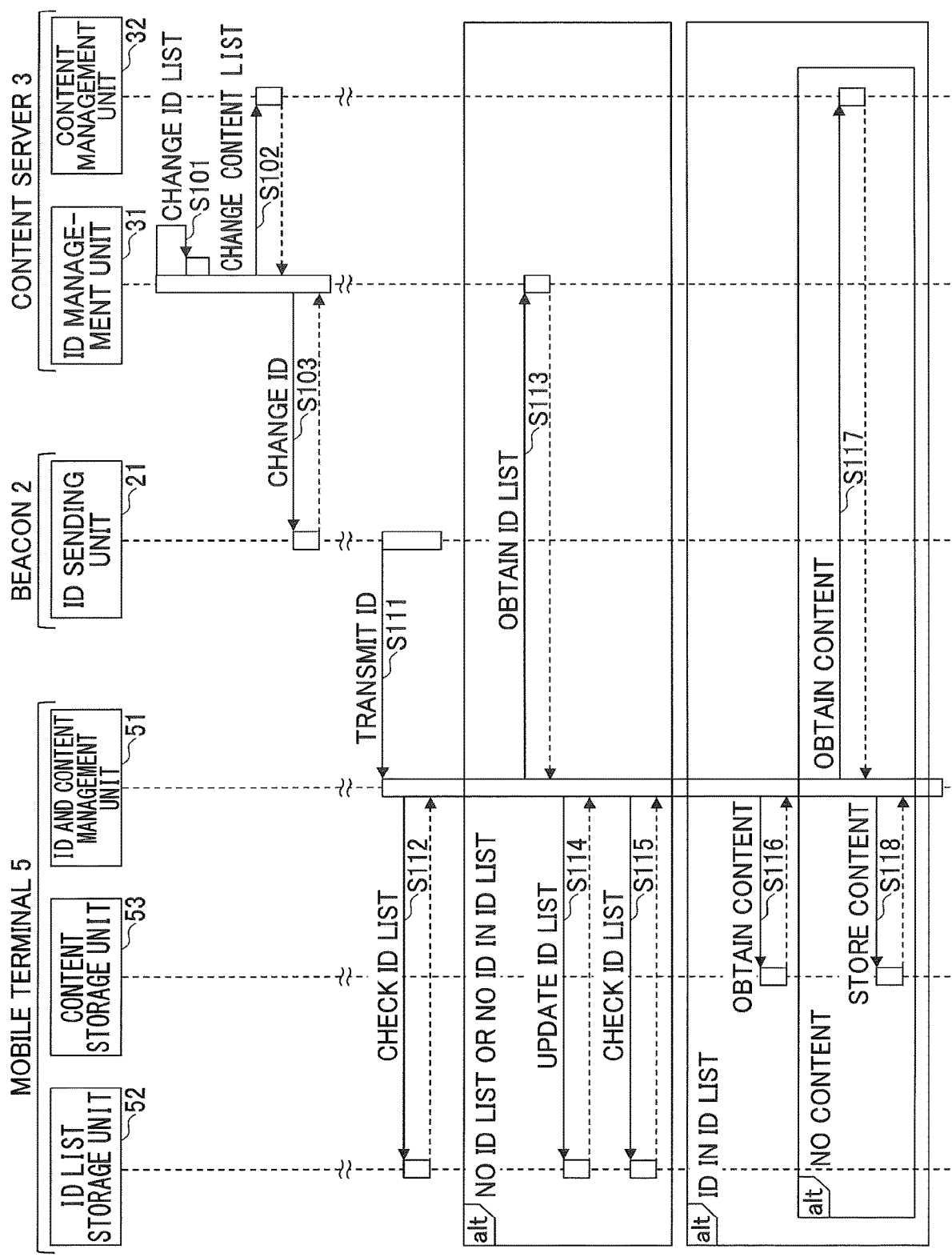
FIG. 6 is a sequence diagram illustrating a first process example.

FIG. 6 is a sequence diagram illustrating a first process example. FIG. 6 illustrates a process of periodically changing beacon IDs, included in signals that are sent from beacons 2 through radio waves or ultrasonic waves, by the content server 3 through the network for the purpose of avoiding masquerading and illustrates a process during subsequent actual operation.

In FIG. 6, the ID management unit 31 of the content server 3 performs a beacon ID changing process in predetermined timing. The predetermined timing is periodic timing according to a security requirement as to which level of security is required. For example, the process may be automatically executed every day at an interval of 24 hours during midnight where there is not a system user.

First, the ID management unit 31 changes the ID list in the content server 3 (step S101). Note that, at a time of initial setting, the same process is performed, apart from nothing being set in the ID list before the change. The after-change ID list is managed and set in such a manner that none of the beacon IDs are the same between the after-change ID list and the before-change ID list. Further, an ID list assumes that there are a plurality of beacons 2. Therefore, for a case where there is only a single beacon 2, it is not necessary to store the information in a form of a list. FIG. 7A illustrates examples of a before-change ID list and an after-change ID list where before-change beacon IDs "1111", "2222", and "3333" for beacon numbers (No) "1", "2", and "3" have been changed to "5555", "6666", and "7777", respectively. Note that the specific form (i.e., the number of digits, specific characters to use, and so forth) of beacon IDs is not limited to the form illustrated in FIG. 7A.

Next, returning to FIG. 6, the ID management unit 31 requests the content management unit 32 to change the content list where pieces of content are associated with beacon IDs (step S102), and the content management unit 32 changes the content list under management to conform to the after-change ID list. Note that, at a time of initial setting, the same process is performed, apart from nothing being set in the ID list before the change. Further, a content list assumes that there are a plurality of beacons 2. For a case where there is only a single beacon 2, it is not necessary to store the information in a form of a list. FIG. 7B illustrates examples of a before-change content list and an after-change content list where associating content IDs "AAAA", "BBBB", and "CCCC" with before-change beacon IDs "1111", "2222", and "3333" is changed to associating the content IDs "AAAA", "BBBB", and "CCCC" with beacon IDs "5555", "6666", and "7777", respectively. Note that a content ID is a specific number uniquely representing a piece of content. Instead of a content ID, it is also possible to associate a piece of content itself with a beacon ID. However, for the sake of convenience, IDs are used in the description.

Next, returning to FIG. 6, the ID management unit 31 requests a beacon 2 (i.e., the ID sending unit 21) to change a beacon ID (step S103), and the beacon 2 (i.e., the ID sending unit 21) changes the own beacon ID. In a case where there are a plurality of beacons 2, the ID management unit 31 performs the same process on each of the beacons 2. FIG. 7C illustrates examples of a before-change beacon ID and an after-change beacon ID of a beacon 2 where a beacon ID "1111" of the beacon 2 (corresponding to the beacon number "1") before change is changed to a beacon ID "5555".

Next, returning to FIG. 6, a process during actual operation will now be described. Note that, according to the present first process example, during actual operation, the mobile terminal 5 receives from a beacon 2 a signal including a beacon ID, and, when determining that it is not possible to successfully determine matching of the signal with the ID list in the ID list storage unit 52 (i.e., when determining that the signal does not conform to the ID list in the ID list storage unit 52), the mobile terminal 5 synchronizes the ID list stored inside with the content server 3 (i.e., overwrites (updates) the ID list with information stored in the content server 3). Thus, it is possible to automatically perform synchronization in appropriate timing.

In FIG. 6, the ID sending unit 21 of the beacon 2 sends a radio wave signal or an ultrasonic signal including the own beacon ID (step S111). The sending of the signal may be performed intermittently or continuously.

Next, in response to receiving the signal sent from the beacon 2, the ID and content management unit 51 of the mobile terminal 5 determines whether the beacon ID included in the received signal is included in the ID list stored in the own ID list storage unit 52 (step S112).

If there is not any ID list or the received beacon ID is not included in the ID list, a process that will now be described is performed. Note that, the case where there is not an ID list is a case where this is the first time for the mobile terminal 5 to receive a signal from a beacon 2. As the case where the received beacon ID is not included in the ID list, a case where the beacon ID that is set in the beacon 2 has been changed to a new beacon ID or a case where the beacon ID masqueraded by a malicious third person is received (this case may be also a case where the masquerading person himself or herself receives the beacon ID) may be assumed.

First, the ID and content management unit 51 requests the ID list from the ID management unit 31 of the content server 3 to obtain the ID list (step S113) and overwrites and updates the ID list stored in the ID list storage unit 52 with the obtained ID list (step S114). FIG. 7D illustrates examples of a before-change ID list and an after-change ID list in the mobile terminal 5 and which are the same as in FIG. 7A. Then, returning to FIG. 6, the ID and content management unit 51 again determines whether the beacon ID included in the signal received from a beacon 2 is included in the ID list stored in the ID list storage unit 52 (step S115).

As a result, when the received beacon ID is included in the ID list, a process that will now be described is performed. First, the ID and content management unit 51 obtains the content associated with the beacon ID from the content storage unit 53 (step S116). If the content storage unit 53 does not include (cache) the content associated with the beacon ID, the ID and content management unit 51 indicates the beacon ID to the content management unit 32 of the content server 3 and requests the content (step S117). As a response, on the basis of the content list, the content management unit 32 sends the content corresponding to the indicated beacon ID to the mobile terminal 5. Then, the ID and content management unit 51 associates the obtained content with a content ID and stores (caches) the content in the content storage unit 53 (step S118). The ID and content management unit 51 then performs a process of a predetermined service such as providing the obtained content to the user of the mobile terminal 5.

However, if the received beacon ID is still not included in the ID list, no particular process is performed. Thus, it is possible to avoid providing content in response to a beacon ID masqueraded by a malicious third person. Note that it is also possible that the ID and content management unit 51 determines beacon IDs that may be masquerades and reports the beacon IDs to the content server 3. In this case, the content server 3 may produce a blacklist of the beacon IDs for preventing the beacon IDs from being used immediately or in future.

Second Process Example

According to the above-described first process example, the mobile terminal 5 receives from a beacon 2 a signal including a beacon ID during actual operation, and, at a time of determining that it is not possible to successfully determine the matching, the mobile terminal 5 performs synchronization of the ID list stored in the mobile terminal 5 with the content server 3 (i.e., the mobile terminal 5 obtains an ID list stored in the content server 3 and updates the ID list stored in the ID list storage unit 52 with the obtained ID list).

Instead, according to a second process example, when the mobile terminal 5 determines at a time of a predetermined user's operation that a predetermined time has elapsed from previous obtaining of an ID list, the mobile terminal 5 performs synchronization of the ID list stored in the mobile terminal 5 with the content server 3 (i.e., the mobile terminal 5 obtains an ID list stored in the content server 3 and updates the ID list stored in the ID list storage unit 52 with the obtained ID list). Thus, it is possible to reduce the frequency of a synchronization process and it is possible to reduce the corresponding process load.

Figure 8:
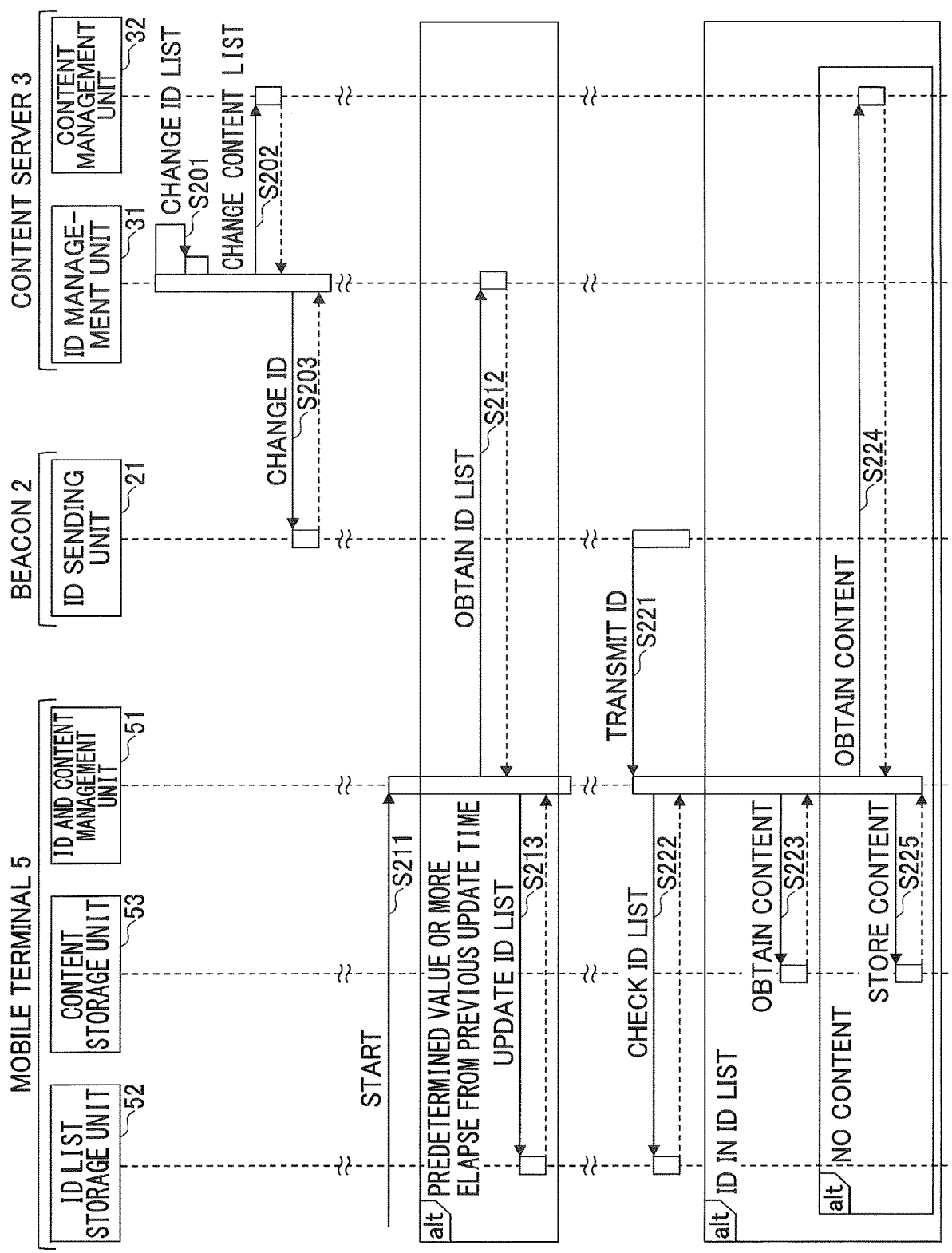
FIG. 8 is a sequence diagram illustrating a second process example.

FIG. 8 is a sequence diagram illustrating the second process example. In FIG. 8, the ID management unit 31 of the content server 3 performs a beacon ID changing process in predetermined timing. The predetermined timing is periodic timing according to a security requirement as to which level of security is required. For example, the process may be automatically executed every day at an interval of 24 hours during midnight where there is not a system user.

First, the ID management unit 31 changes the ID list in the content server 3 (step S201). Note that, at a time of initial setting, the same process is performed, apart from nothing being set in the ID list before the change. The after-change ID list is managed and set in such a manner that none of the beacon IDs are the same between the after-change ID list and the before-change ID list. Further, an ID list assumes that there are a plurality of beacons 2. Therefore, for a case where there is only a single beacon 2, it is not necessary to store the information in a form of a list. FIG. 9A illustrates examples of a before-change ID list and an after-change ID list. Note that, the specific form (the number of digits, specific characters to use, and so forth) of beacon IDs is not limited to the form illustrated in FIG. 9A.

Next, returning to FIG. 8, the ID management unit 31 requests the content management unit 32 to change the content list where pieces of content are associated with beacon IDs (step S202), and the content management unit 32 changes the content list under management to conform to the after-change ID list. Note that, at a time of initial setting, the same process is performed, apart from nothing being set in the ID list before the change. Further, a content list assumes that there are a plurality of beacons 2. For a case where there is only a single beacon 2, it is not necessary to store the information in a form of a list. FIG. 9B illustrates examples of a before-change content list and an after-change content list.

Next, returning to FIG. 8, the ID management unit 31 requests the ID sending unit 21 of the beacon 2 to change the beacon ID (step S203), and the ID sending unit 21 of the beacon 2 changes the own beacon ID. In a case where there are a plurality of beacons 2, the ID management unit 31 performs the same process on each of the beacons 2. FIG. 9C illustrates examples of a before-change beacon ID and an after-change beacon ID of a beacon 2.

Next, in FIG. 8, it is assumed that, during actual operation, the user of the mobile terminal 5 starts the ID and content management unit 51 (starts an application that configures the ID and content management unit 51) (step S211). The started ID and content management unit 51 determines whether a predetermined time has elapsed from the previous update of the ID list. When determining that the predetermined time has elapsed, the ID and content management unit 51 performs a process that will now be described. The predetermined time is desirably made equal to a cycle at which the content server 3 changes the ID list. Note that, in the ID list, the updated date and time are recorded, and an elapse time is determined from a comparison of a current time with updated date and time.

The ID and content management unit 51 requests from the ID management unit 31 of the content server 3 the ID list, to obtain the ID list (step S212), and overwrites and updates the ID list of the ID list storage unit 52 with the obtained ID list (step S213). FIG. 9D illustrates examples of a before-change ID list and an after-change ID list in the mobile terminal 5, and illustrates a state where, as a result of it being determined that the elapse time exceeds, for example, 24 hours, an update has been performed accordingly.

Thereafter, returning to FIG. 8, the ID sending unit 21 of the beacon 2 sends a radio wave signal or an ultrasonic signal including the own beacon ID (step S221). In response to receiving the signal sent from the beacon 2, the ID and content management unit 51 of the mobile terminal 5 determines whether the beacon ID included in the received signal is included in the ID list stored in the ID list storage unit 52 (step S222).

If the received beacon ID is included in the ID list, a process that will now be described is performed. First, the ID and content management unit 51 obtains from the content storage unit 53 the content associated with the beacon ID (step S223). If the content storage unit 53 does not include (cache) the content associated with the beacon ID, the ID and content management unit 51 indicates the beacon ID to the content management unit 32 of the content server 3 and requests the content (step S224). As a response, on the basis of the content list, the content management unit 32 sends the content corresponding to the indicated beacon ID to the mobile terminal 5. Then, the ID and content management unit 51 associates the obtained content with a content ID and stores (caches) the content in the content storage unit 53 (step S225). The ID and content management unit 51 then performs a process of a predetermined service such as submitting the obtained content to the user of the mobile terminal 5.

However, in a case where the received beacon ID is not included in the ID list, the ID list has been already synchronized into the latest ID list. Therefore, it is not necessary to newly perform a synchronization process, and no particular process is performed. Thus, it is possible to avoid providing content in response to a beacon ID masqueraded by a malicious third person. Note that it is also possible that the ID and content management unit 51 determines beacon IDs that may be masquerades and reports the beacon IDs to the content server 3. In this case, the content server 3 may produce a blacklist of the beacon IDs for preventing the beacon IDs from being used in future.

Third Process Example

According to the above-described second process example, when the mobile terminal 5 determines at a time of a predetermined user's operation that a predetermined time has elapsed from previous obtaining of an ID list, the mobile terminal 5 performs synchronization of the ID list stored in the mobile terminal 5 with the content server 3.

According to a third process example, at a time when the content server 3 updates an ID list, synchronization of the ID list stored in the mobile terminal 5 is performed by push type with the content server (i.e., an ID list is transmitted from the content server 3, and the mobile terminal 5 updates the ID list stored in the ID list storage unit 52 with the thus transmitted ID list). Thus, it is possible to reduce the frequency of a synchronization process, and it is possible to reduce the corresponding process load.

Figure 10:
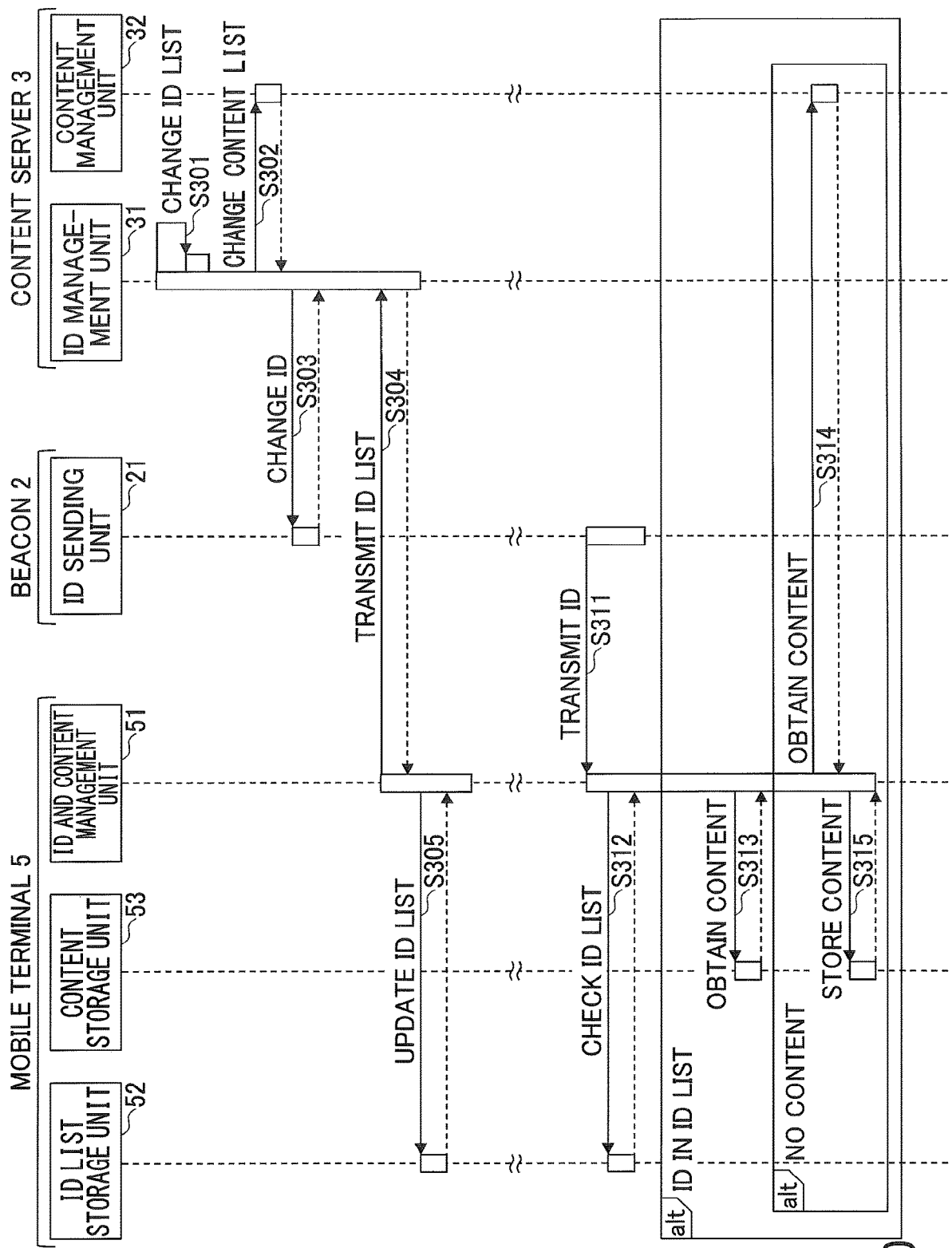
FIG. 10 is a sequence diagram illustrating a third process example.

FIG. 10 is a sequence diagram illustrating the third process example. In FIG. 10, the ID management unit 31 of the content server 3 performs a beacon ID changing process in predetermined timing. The predetermined timing is periodic timing according to a security requirement as to which level of security is required. For example, the process may be automatically executed every day at an interval of 24 hours during midnight where there is not a system user.

First, the ID management unit 31 changes the ID list of the content server 3 (step S301). Note that, at a time of initial setting, the same process is performed, apart from nothing being set in the ID list before the change. The after-change ID list is managed and set in such a manner that none of the beacon IDs are the same between the after-change ID list and the before-change ID list. Further, an ID list assumes that there are a plurality of beacons 2. Therefore, for a case where there is only a single beacon 2, it is not necessary to store the information in a form of a list. FIG. 11A illustrates examples of a before-change ID list and an after-change ID list. Note that, the specific form (the number of digits, specific characters to use, and so forth) of beacon IDs is not limited to the form illustrated in FIG. 11A.

Next, returning to FIG. 10, the ID management unit 31 requests the content management unit 32 to change the content list where pieces of content are associated with beacon IDs (step S302), and the content management unit 32 changes the content list under management to conform to the after-change ID list. Note that, at a time of initial setting, the same process is performed, apart from nothing being set in the ID list before the change. Further, a content list assumes that there are a plurality of beacons 2. For a case where there is only a single beacon 2, it is not necessary to store the information in a form of a list. FIG. 11B illustrates examples of a before-change content list and an after-change content list.

Next, returning to FIG. 10, the ID management unit 31 requests the ID sending unit 21 of the beacon 2 to change the beacon ID (step S303), and the ID sending unit 21 of the beacon 2 changes the own beacon ID. FIG. 11C illustrates examples of a before-change beacon ID and an after-change beacon ID of a beacon 2.

Next, returning to FIG. 10, the ID management unit 31 transmits (i.e., as a push notification, mail transmission, or the like) to the mobile terminal 5 (i.e., the ID and content management unit 51) the after-change ID list (step S304). The ID and content management unit 51 overwrites and updates with the received ID list the ID list stored in the ID list storage unit 52 (step S305). FIG. 11D illustrates examples of a before-change ID list and an after-change ID list in the mobile terminal 5. If there are a plurality of beacons 2, the same process is performed on each of the beacons 2.

Thereafter, returning to FIG. 10, the ID sending unit 21 of the beacon 2 sends a radio wave signal or an ultrasonic signal including the own beacon ID (step S311). In response to receiving the signal sent from the beacon 2, the ID and content management unit 51 of the mobile terminal 5 determines whether the beacon ID included in the received signal is included in the ID list stored in the ID list storage unit 52 (step S312).

If the received beacon ID is included in the ID list, a process that will now be described is performed. First, the ID and content management unit 51 obtains from the content storage unit 53 the content associated with the beacon ID (step S313). If the content storage unit 53 does not include (cache) the content associated with the beacon ID, the ID and content management unit 51 indicates the beacon ID to the content management unit 32 of the content server 3 and requests the content (step S314). As a response, on the basis of the content list, the content management unit 32 sends the content corresponding to the indicated beacon ID to the mobile terminal 5. Then, the ID and content management unit 51 associates the obtained content with a content ID and stores (caches) the content in the content storage unit 53 (step S315). The ID and content management unit 51 then performs a process of a predetermined service such as submitting the obtained content to the user of the mobile terminal 5.

However, in a case where the received beacon ID is not included in the ID list, the ID list has been already synchronized into the latest ID list. Therefore, it is not necessary to newly perform a synchronization process, and no particular process is performed. Thus, it is possible to avoid providing content in response to a beacon ID masqueraded by a malicious third person. Note that it is also possible that the ID and content management unit 51 determines beacon IDs that may be masquerades and reports the beacon IDs to the content server 3. In this case, the content server 3 may produce a blacklist of the beacon IDs for preventing the beacon IDs from being used in future.

Fourth Process Example

According to the above-described first through third process examples, a single ID list is provided to the mobile terminal 5 each time of a change. According to a fourth process example, a plurality of ID lists are provided in consideration of future changes of an ID list. Therefore, even in a case where the mobile terminal 5 cannot perform synchronization with the content server 3, the mobile terminal can perform a suitable process if it is possible to use a thus previously provided ID list.

Figure 12:
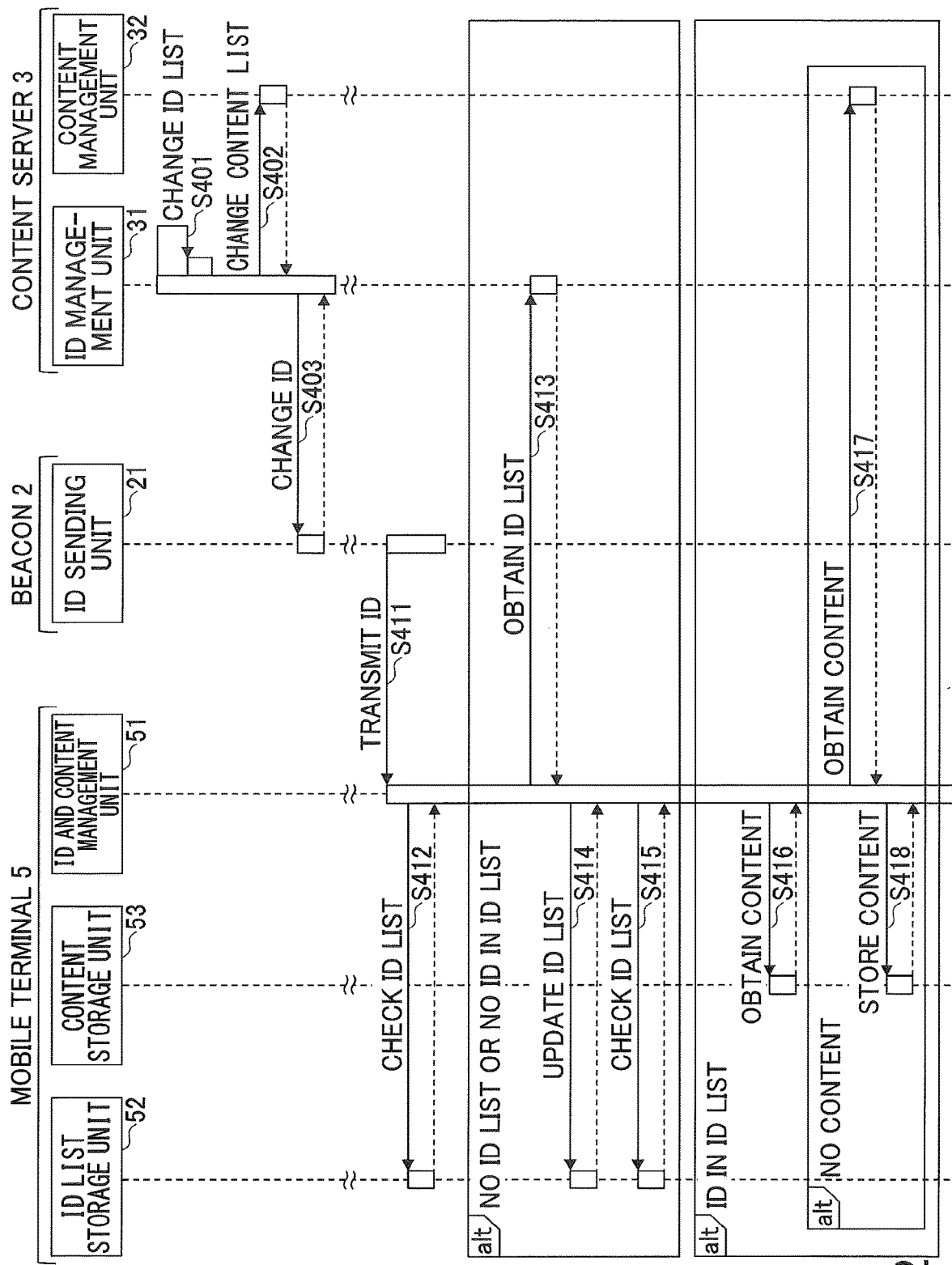
FIG. 12 is a sequence diagram illustrating a fourth process example.

FIG. 12 is a sequence diagram illustrating the fourth process example. Note that, a case where the fourth process example is applied to the first process example will now be described. However, it is also possible to apply the fourth process example to the second process example or the third process example in the same way.

In FIG. 12, the ID management unit 31 of the content server 3 performs a beacon ID changing process in predetermined timing. The predetermined timing is periodic timing according to a security requirement as to which level of security is required. For example, the process may be automatically executed every day at an interval of 24 hours during midnight where there is not a system user.

In the content server 3, as illustrated in FIG. 13A, the ID list for a current time is stored, and the ID lists for the next time and thereafter are also stored. An after-change ID list is managed and set in such a manner that none of the beacon IDs are the same between the after-change ID list and the before-change ID list. Further, an ID list assumes that there are a plurality of beacons 2. Therefore, for a case where there is only a single beacon 2, it is not necessary to store the information in a form of a list.

In FIG. 12, the ID management unit 31 changes the current ID list of the content server 3 according to the term of validity of the ID list (step S401). FIG. 13B illustrates examples of a before-change ID list and an after-change ID list.

Next, returning to FIG. 12, the ID management unit 31 requests the content management unit 32 to change the content list where pieces of content are associated with beacon IDs (step S402), and the content management unit 32 changes the content list under management in conformity to the after-change ID list. Further, an ID list assumes that there are a plurality of beacons 2. Therefore, for a case where there is only a single beacon 2, it is not necessary to store the information in a form of a list. FIG. 13C illustrates examples of a before-change content list and an after-change content list.

Next, returning to FIG. 12, the ID management unit 31 requests the ID sending unit 21 of the beacon 2 to change the beacon ID (step S403), and the ID sending unit 21 of the beacon 2 changes the own beacon ID. If there are a plurality of beacons 2, the same process is performed on each of the beacons 2. FIG. 13D illustrates examples of a before-change beacon ID and an after-change beacon ID in the beacon 2. Note that, in a case where it is possible that the beacon 2 has a function to determine the current date and time and to change the own beacon ID, the content server 3 may provide to the beacon 2 a plurality of ID lists in consideration of future changes. In this case, even in a case where the content server 3 cannot set a beacon ID to the beacon 2, the beacon 2 can perform a suitable process if the beacon 2 can use a thus previously provided ID list.

Next, returning to FIG. 12, during actual operation, the ID sending unit 21 of the beacon 2 sends a radio wave signal or an ultrasonic signal including the own beacon ID (step S411). The sending of the signal may be performed intermittently or continuously.

After receiving the signal from the beacon 2, the ID and content management unit 51 of the mobile terminal 5 determines whether the beacon ID included in the received signal is included in the ID list stored in the ID list storage unit 52 (step S412).

If an ID list is not included in the ID list storage unit 52 or the received beacon ID is not included in the ID list, a process that will now be described is performed. Note that the case where an ID list is not included in the ID list storage unit 52 is a case where this is the first time for the mobile terminal 5 to receive a signal from a beacon 2. As the case where the received beacon ID is not included in the ID list, a case where the beacon ID that is set to the beacon 2 has been changed to a new beacon ID or a case where the beacon ID masqueraded by a malicious third person is received (this case may be also a case where the person who masquerades the beacon ID himself or herself receives the beacon ID) may be assumed.

First, the ID and content management unit 51 requests the ID lists from the ID management unit 31 of the content server 3 and obtains the ID lists (step S413). At this time, the plurality of ID lists are obtained in consideration of future changes. Note that, by indicating to the content server 3 the terms of validity of the ID lists that the mobile terminal 5 has already obtained, the mobile terminal 5 may obtain only the ID lists that have not been provided yet.

Figure 13E:
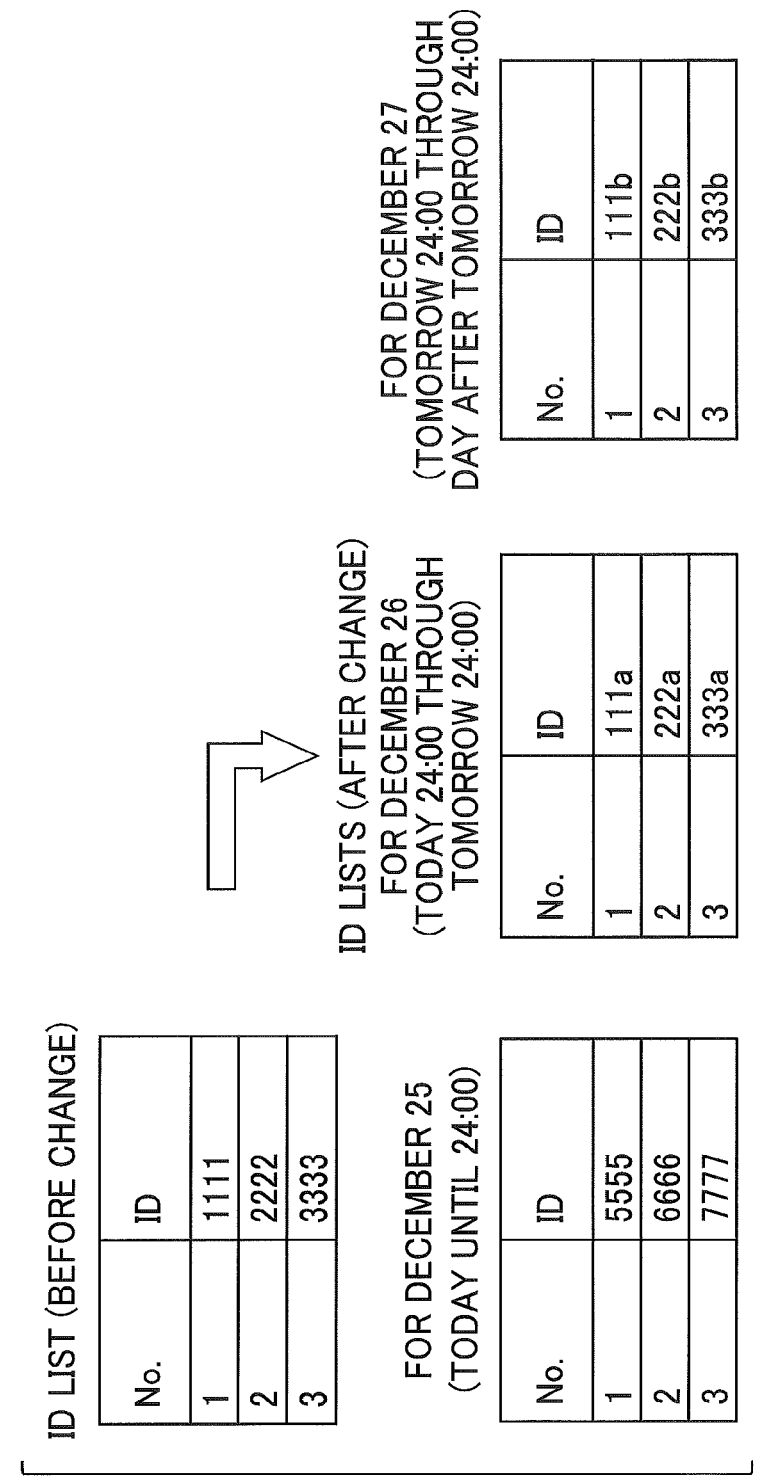
FIG. 13E illustrates an example of changes in various data according to the fourth process example (5/5).

Next, the ID and content management unit 51 updates the ID list storage unit 52 by using the obtained ID lists (step S414). Among the plurality of ID lists, the ID lists for which the current time falls within their terms of validity are valid ID lists. FIG. 13E illustrate examples of a before-change ID list and after-change ID lists in the mobile terminal 5. Then, returning to FIG. 12, the ID and content management unit 51 again determines whether the beacon ID included in the signal received from beacon 2 is included in the ID list stored in the ID list storage unit 52 (step S415).

In a case where the received beacon ID is included in the currently valid ID list, a process that will now be described is performed. First, the ID and content management unit 51 obtains from the content storage unit 53 the content associated with the beacon ID (step S416). However, if the content storage unit 53 does not have (cache) the content associated with the beacon ID, the ID and content management unit 51 indicates the beacon ID to the content management unit 32 of the content server 3 to request the content (step S417). As a response, on the basis of the content list, the content management unit 32 sends the content corresponding to the indicated beacon ID to the mobile terminal 5. Then, the ID and content management unit 51 associates the obtained content with a content ID and stores (caches) the content in the content storage unit 53 (step S418). The ID and content management unit 51 then performs a process of a predetermined service such as submitting the obtained content to the user of the mobile terminal 5.

However, in a case where the received beacon ID is still not included in the ID list, no particular process is performed. Thus, it is possible to avoid providing content in response to a beacon ID masqueraded by a malicious third person. Note that it is also possible that the ID and content management unit 51 determines beacon IDs that may be masquerades and reports the beacon IDs to the content server 3. In this case, the content server 3 may produce a blacklist of the beacon IDs for avoiding usage in future.

Fifth Process Example

According to the above-described first through fourth process examples, a beacon ID in an ID list, as it is, is used as a beacon ID that is sent from a beacon 2, and, at a time of a change, a change is performed in such a manner that none of the beacon IDs are the same between before and after the change. As a result, candidates for beacon IDs may be depleted, and beacon IDs may be easily analyzed. According to a fifth process example, beacon IDs in an ID list are expressed by combinations of base IDs and descriptions of encryption manners. Then, a beacon 2 sends an encrypted base ID (i.e., an encrypted ID) obtained from encrypting a base ID according to a described encryption manner and the description of the encryption manner. Thus, it is sufficient to change an encryption manner while leaving a base ID unchanged. Therefore, a change of a beacon ID can be implemented free from depletion of beacon ID candidates and free from beacon IDs being analyzed.

Figure 14:
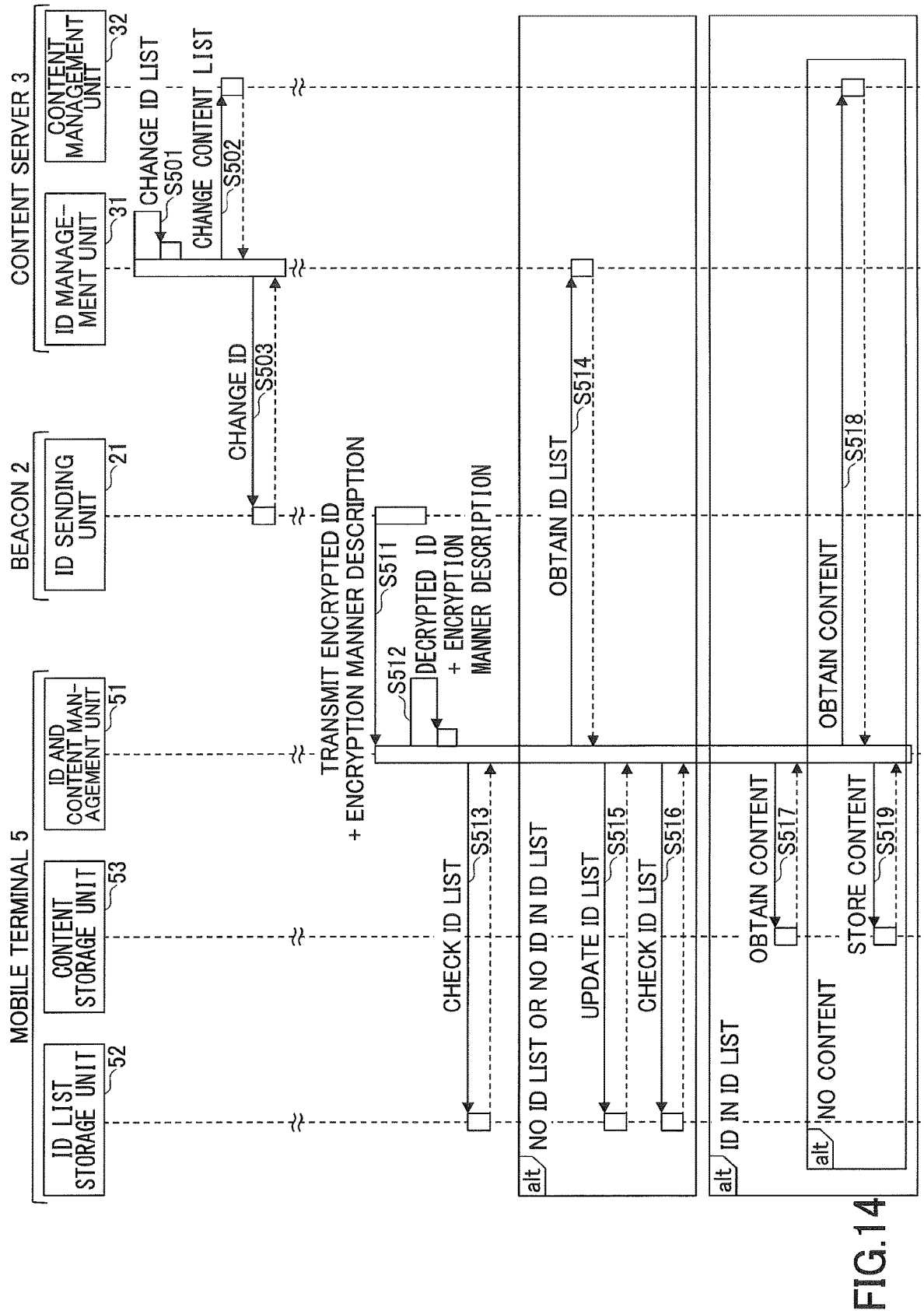
FIG. 14 is a sequence diagram illustrating a fifth process example.

FIG. 14 is a sequence diagram illustrating the fifth process example. Note that a case where the fifth process example is applied to the first process example will now be described. However, it is also possible to apply the fifth process example to the second process example, the third process example, or the fourth process example in the same way.

In FIG. 14, the ID management unit 31 of the content server 3 performs a beacon ID changing process in predetermined timing. The predetermined timing is periodic timing according to a security requirement as to which level of security is required. For example, the process may be automatically executed every day at an interval of 24 hours during midnight where there is not a system user.

First, the ID management unit 31 changes the ID list in the content server 3 (step S501). Note that, an ID list assumes that there are a plurality of beacons 2. Therefore, for a case where there is only a single beacon 2, it is not necessary to store the information in a form of a list.

Beacon IDs in an ID list according to the present process example are combinations of base IDs and descriptions of encryption manners; the base IDs are not changed and only the descriptions of encryption manners are changed so that it is possible to change the ID list without duplication with the before-change beacon IDs. Note that it is also possible to change also base IDs. FIG. 15A illustrates examples of a before-change ID list and an after-change ID list where beacon IDs "1111X", "2222X", and "3333X" for beacon numbers (No) "1", "2", and "3" before being changed are changed to "1111Y", "2222Y", and "3333Y", respectively. The sections "1111", "2222", and "3333" are base IDs and the sections "X" and "Y" are descriptions of encryption manners. Descriptions of encryption manners include descriptions for identifying encryption algorithms and encryption keys. Descriptions of encryption manners may include only encryption keys in a case where an encryption algorithm is predetermined. Further, in the above-mentioned example, the encryption manners of the respective beacons 2 are changed from "X" to "Y" in the same way. However, different encryption manners may be used for the beacons 2, respectively.

Next, returning to FIG. 14, the ID management unit 31 requests the content management unit 32 to change the content list where pieces of content are associated with beacon IDs (step S502), and the content management unit 32 changes the content list under management in conformity with the after-change ID list. Further, an ID list assumes that there are a plurality of beacons 2. Therefore, for a case where there is only a single beacon 2, it is not necessary to store the information in a form of a list. FIG. 15B illustrates examples of a before-change content list and an after-change content list. In this example, a content list where before-change beacon IDs "1111X", "2222X", and "3333X" are associated with content IDs "AAAA", "BBBB", and "CCCC", respectively, is changed to a content list where beacon IDs "1111Y", "2222Y", and "3333Y" are associated with content IDs "AAAA", "BBBB", and "CCCC", respectively.

Next, returning to FIG. 14, the ID management unit 31 requests the ID sending unit 21 of the beacon 2 to change the beacon ID (step S503), and the ID sending unit 21 of the beacon 2 changes the own beacon ID. Note that in a case of using a manner of actual operation to change only a description of an encryption manner, the ID management unit 31 may send only a description of an encryption manner to the beacon 2. If there are a plurality of beacons 2, the same process is performed on each of the beacons 2. FIG. 15C illustrates examples of a before-change beacon ID and an after-change beacon ID in the beacon 2 where, in the beacon 2 (corresponding to the beacon number "1") before being changed having a base ID (base) "1111" and an encryption manner "X", the base ID (base) is left unchanged as "1111" while the encryption manner is changed to "Y". Note that FIG. 15C also illustrates an encrypted ID obtained from encrypting the base ID according to the encryption manner.

Next, returning to FIG. 14, during actual operation, the ID sending unit 21 of the beacon 2 sends a radio wave signal or an ultrasonic signal including the encrypted ID obtained from encrypting the base ID according to the encryption manner and the description of the encryption manner (step S511). The sending of the signal may be performed intermittently or continuously.

Next, after receiving the signal sent from the beacon 2, on the basis of the encrypted ID and the description of the encryption manner included in the received signal, the ID and content management unit 51 of the mobile terminal 5 decrypts the encrypted ID with the use of the described encryption manner to generate the beacon ID that is the combination of the decrypted ID (corresponding to the base ID) and the description of the encryption manner (step S512).

Next, the ID and content management unit 51 determines whether the generated beacon ID is included in the ID list stored in the ID list storage unit 52 (step S513).

Then, if an ID list is not included in the ID list storage unit 52 or the generated beacon ID is not included in the ID list, a process that will now be described is performed. Note that, the case where an ID list is not included in the ID list storage unit 52 is a case where this is the first time for the mobile terminal 5 to receive a signal from a beacon 2. As the case where the generated beacon ID is not included in the ID list, a case where the encryption manner that is set to the beacon 2 has been changed to a new encryption manner and thus the beacon ID has been changed to a new beacon ID or a case where the beacon ID masqueraded by a malicious third person is received (this case may be also a case where the person who masquerades the beacon ID himself or herself receives the beacon ID) may be assumed.

First, the ID and content management unit 51 requests the ID list from the ID management unit 31 of the content server 3 and obtains the ID list (step S514), and overwrites and updates the ID list stored in the ID list storage unit 52 with the obtained ID list (step S515). FIG. 15D illustrates examples of a before-change ID list and an after-change ID list in the mobile terminal 5. Then, returning to FIG. 14, the ID and content management unit 51 again determines whether the beacon ID generated from the signal received from the beacon 2 is included in the ID list stored in the ID list storage unit 52 (step S516).

If the generated beacon ID is included in the ID list, a process that will now be described is performed. First, the ID and content management unit 51 obtains from the content storage unit 53 the corresponding content associated with the beacon ID (step S517). However, if the content storage unit 53 does not have (cache) the corresponding content associated with the beacon ID, the ID and content management unit 51 indicates to the content management unit 32 of the content server 3 the beacon ID and requests the content (step S518). As a response, on the basis of the content list, the content management unit 32 sends the content corresponding to the indicated beacon ID to the mobile terminal 5. Then, the ID and content management unit 51 associates the obtained content with a content ID and stores (caches) the content in the content storage unit 53 (step S519). The ID and content management unit 51 then performs a process of a predetermined service such as submitting the obtained content to the user of the mobile terminal 5.

However, if the generated beacon ID is still not included in the ID list, no particular process is performed. Thus, it is possible to avoid providing content in response to a beacon ID masqueraded by a malicious third person. Note that it is also possible that the ID and content management unit 51 determines beacon IDs that may be masquerades and reports the beacon IDs to the content server 3. In this case, the content server 3 may produce a blacklist of the beacon IDs for preventing the beacon IDs from being used in future.

<General Overview>

As described above, according to the present embodiment, it is possible to avoid masquerading of identification information at a beacon or the like.

Thus, the identification information providing systems, the identification information providing apparatuses, the identification information providing methods, and the non-transitory recording media have been described in the embodiments of the present invention. Although the specific concrete examples have been illustrated to describe the present invention, it is clear that, without departing from the wide concept and scope defined in the claims, various modifications and changes of these specific examples can be made. In other words, the details of the specific examples and the accompanying drawings should not be interpreted to limit the present invention.

<Correspondences Between Terms in Embodiment and Terms in Claims>

A beacon ID is one example of "identification information". A beacon 2 is one example of a "sending processor". The content server 3 is one example of a "managing processor". The mobile terminal 5 is one example of a "receiving processor".

RELATED ART DOCUMENT

Patent Document

Patent Document 1: Japanese Unexamined Patent Application Publication No. 2004-32133

What is claimed is:

1. An identification information providing system, comprising:
sending circuitry configured to send a predetermined signal including identification information;
managing circuitry configured to
set or change the identification information; and
manage the identification information; and
receiving circuitry configured to
receive predetermined identification information;
perform synchronization; and
determine, according to a result of matching between the predetermined identification information and a received predetermined signal, whether the sending circuitry is authorized to send the predetermined signal, wherein
a description, indicating an encryption manner, is added to base identification information to express the identification information,
the predetermined signal includes encrypted identification information, that is obtained from encrypting base identification information according to an encryption manner, and a description indicating the encryption manner, and
the receiving circuitry is further configured to add the base identification information, obtained from decrypting the encrypted identification information with use of a received description indicating the encryption manner, to the description indicating the encryption manner to generate the identification information used to perform the matching.

2. The identification information providing system according to claim 1, wherein the managing circuitry is further configured to provide the predetermined identification information to the receiving circuitry in response to an inquiry sent from the receiving circuitry in a case that the receiving circuitry determines that the sending circuitry is not authorized.

3. The identification information providing system according to claim 1, wherein the managing circuitry is further configured to provide the predetermined identification information to the receiving circuitry in response to an inquiry sent from the receiving circuitry in a case that the receiving circuitry determines, at a time of an operation of a predetermined user, that a predetermined time has elapsed from previously obtained identification information.

4. The identification information providing system according to claim 1, wherein the managing circuitry is further configured to provide, according to a predetermined timing, the predetermined identification information to the receiving circuitry.

5. The identification information providing system according to claim 1, wherein the managing circuitry is further configured to provide, in a case of determining that the sending circuitry is authorized, content to the receiving circuitry, the content associated with the predetermined identification information used to determine that the sending circuitry is authorized.

6. The identification information providing system according to claim 1, wherein the receiving circuitry is further configured to report, in a case of determining that the sending circuitry is not authorized, predetermined identification information used to determine that the sending circuitry is not authorized to the managing circuitry.

7. The identification information providing system according to claim 1, wherein the managing circuitry is further configured to provide, to the receiving circuitry, a plurality of values of predetermined identification information for a future change of the identification information.

8. The identification information providing system according to claim 1, wherein the sending circuitry is a component of a beacon device.

9. The identification information providing system according to claim 8, wherein the identification information is a beacon ID.

10. The identification information providing system according to claim 1, wherein the receiving circuitry is a component of a mobile terminal.

11. The identification information providing system according to claim 1, wherein the managing circuitry is a component of a content server.

12. The identification information providing system according to claim 1, wherein
the receiving circuitry is further configured to transmit, in a case that the sending circuitry is authorized, a content request to the managing circuitry, and
the managing circuitry is further configured to transmit, in response to receiving the content request from the receiving circuitry, content corresponding to the content request to the receiving circuitry.

13. An identification information providing apparatus, comprising:
managing circuitry configured to
set or change identification information of sending circuitry that is configured to send a predetermined signal including the identification information;
manage the identification information;
provide predetermined identification information to receiving circuitry in response to a request from the receiving circuitry, the predetermined identification information causing the receiving circuitry to perform synchronization using the predetermined identification information; and
assist the receiving circuitry to perform matching, based on the predetermined identification information, between the predetermined identification information and a received predetermined signal to determine whether the sending circuitry is authorized to send the predetermined signal, wherein
a description, indicating an encryption manner, is added to base identification information to express the identification information,
the predetermined signal includes encrypted identification information, that is obtained from encrypting base identification information according to an encryption manner, and a description indicating the encryption manner, and
the receiving circuitry is configured to add the base identification information, obtained from decrypting the encrypted identification information with use of a received description indicating the encryption manner, to the description indicating the encryption manner to generate the identification information used to perform the matching.

14. The identification information providing apparatus according to claim 13, wherein the sending circuitry is a component of a beacon device.

15. The identification information providing apparatus according to claim 14, wherein the identification information is a beacon ID.

16. The identification information providing apparatus according to claim 13, wherein the receiving circuitry is a component of a mobile terminal.

17. An identification information providing method, comprising:
setting or changing, by managing circuitry, identification information of sending circuitry that is configured to send a predetermined signal including the identification information;
managing, by the managing circuitry, the identification information;
providing predetermined identification information to receiving circuitry in response to a request from the receiving circuitry, the predetermined identification information causing the receiving circuitry to perform synchronization using the predetermined identification information; and
assisting, by the managing circuitry the receiving circuitry to perform matching, based on the predetermined identification information, between the predetermined identification information and a received predetermined signal to determine whether the sending circuitry is authorized to send the predetermined signal, wherein
a description, indicating an encryption manner, is added to base identification information to express the identification information,
the predetermined signal includes encrypted identification information, that is obtained from encrypting base identification information according to an encryption manner, and a description indicating the encryption manner, and
the receiving circuitry is configured to add the base identification information, obtained from decrypting the encrypted identification information with use of a received description indicating the encryption manner, to the description indicating the encryption manner to generate the identification information used to perform the matching.

18. A non-transitory computer readable medium storing computer executable instructions which, when executed by managing circuitry of a computer, cause the processing circuitry to:
set or change identification information of sending circuitry that is configured to send a predetermined signal including the identification information;
manage the identification information;
provide predetermined identification information to receiving circuitry in response to a request from the receiving circuitry, the predetermined identification information causing the receiving circuitry to perform synchronization using the predetermined identification information; and
assist the receiving circuitry to perform matching, based on the predetermined identification information, between the predetermined identification information and a received predetermined signal to determine whether the sending circuitry is authorized to send the predetermined signal, wherein
a description, indicating an encryption manner, is added to base identification information to express the identification information,
the predetermined signal includes encrypted identification information, that is obtained from encrypting base identification information according to an encryption manner, and a description indicating the encryption manner, and
the receiving circuitry is configured to add the base identification information, obtained from decrypting the encrypted identification information with use of a received description indicating the encryption manner, to the description indicating the encryption manner to generate the identification information used to perform the matching.

* * * * *